United States Patent [19]

Tsuji et al.

[11] Patent Number: 4,478,503
[45] Date of Patent: Oct. 23, 1984

[54] WEIGHTED METERING DEVICE IN CAMERA

[75] Inventors: Sadahiko Tsuji; Tokuichi Tsunekawa, both of Kanagawa, Japan

[73] Assignee: Canon Kabushiki Kaisha, Tokyo, Japan

[21] Appl. No.: 347,563

[22] Filed: Feb. 10, 1982

[30] Foreign Application Priority Data

Feb. 19, 1981 [JP] Japan .................................. 56-23597

[51] Int. Cl.³ .......................................... G03B 7/099
[52] U.S. Cl. .................................................. 354/480
[58] Field of Search ............... 354/25 R, 31, 59, 479, 354/480

[56] References Cited

U.S. PATENT DOCUMENTS 3,724,343  4/1973  Lancor, Jr. et al. ................. 354/31

Primary Examiner—Russell E. Adams, Jr.
Attorney, Agent, or Firm—Toren, McGeady and Stanger

[57] ABSTRACT

In the disclosed light metering device, a scanning reflecting mirror directs a portion of light that has passed through an objective lens to a light-sensitive element and a driving device changes the positional relationship of the light-sensitive element and the reflecting mirror for light metering relative to each other so as to scan the image format formed by the objective lens. A weighting arrangement gives light metering outputs different weights corresponding to the scanning positions in the image format. This forms a light-metering weighting device in the camera.

5 Claims, 6 Drawing Figures

U.S. Patent   Oct. 23, 1984   4,478,503
FIG.1
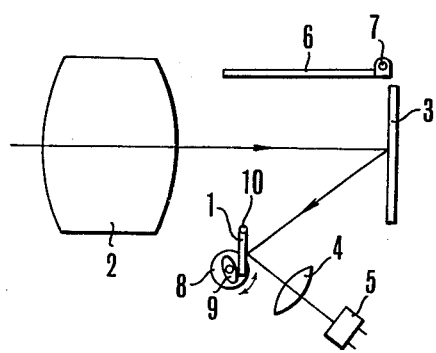
FIG.2
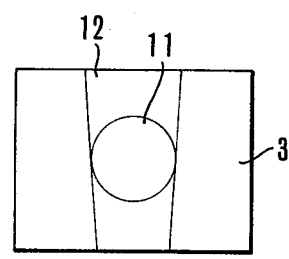
FIG.3   FIG.4   FIG.5
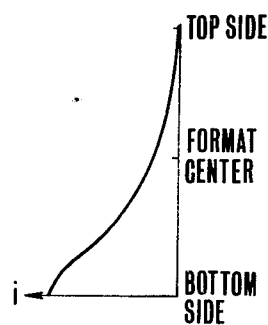 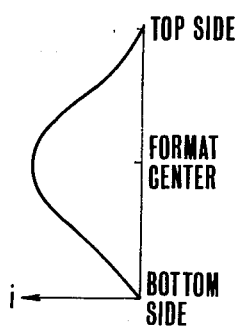 
FIG.6
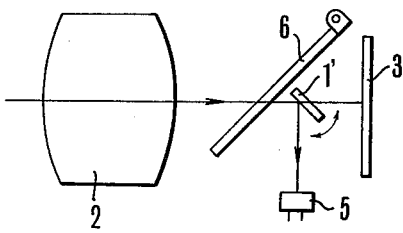

WEIGHTED METERING DEVICE IN CAMERA

BACKGROUND OF THE INVENTION

1. Field of the Invention

This invention relates to TTL light metering devices for producing exposure value of an image by using the light passed through the objective lens, and more particularly to a weighted light metering device capable of selecting a desired region of meter sensitivity of the image format of obtaining a proper meter sensitivity distribution.

2. Description of the Prior Art

In the past, light metering devices for determining exposure values of an image format using the light passed through the objective lens, have achieved their objects by suitably changing the light metering region on the image format and meter sensitivity distribution. Light metering devices having suitable variable sensitivity distributions, have been proposed, for example, in U.S. Pat. Nos. 3,575,095 and 3,612,703 and Japanese Utility Model Application No. Sho 53-42114.

Already known in the art are a wide variety of devices for selectively controlling the meter sensitivity distribution with light entering the objective lens. The conventional methods of changing the meter sensitivity distribution, however, generally necessitate the use of two or more light metering optical systems in combination with mechanical or electrical changeover means. They therefore have the drawback that great expense is involved in using a corresponding number of pairs of a lens system and a photosensitive element. The light metering electrical circuit is also complicated. Another drawback is that the meter sensitivity distribution caused by the low degree of design flexibility of the geometrical arrangement to read the image format with a heavy weighting not right on a desired portion thereof, and free control of the meter sensitivity distribution cannot be permitted.

SUMMARY OF THE INVENTION

It is, therefore, an object of the present invention to provide a light metering weighting device for use in a camera which has overcome the above-described problems of the prior art device and in which a single light metering optical system suffices to make possible variation of the meter sensitivity distribution, and to obtain the reasonable sensitivity distribution.

In an embodiment of the invention, the device comprises a photosensitive element responsive to the brightness of an object to be photographed. That is, an image format, a position-changeable reflecting member for light metering directing a portion of the light that has passed through the objective lens to the photosensitive element, a drive mechanism for changing the mutual positional relationship of the photosensitive element and the reflection member so as to scan the image format, and weighting means for giving the light metering outputs different weights depending upon the different scanning positions in the image format.

BRIEF DESCRIPTION OF THE DRAWINGS

FIG. 1 is a schematic view of the optical system of an embodiment of a light metering device according to the present invention.

FIG. 2 is a plan view of an image format with the location of a region to which the light metering device of the invention is responsive.

FIGS. 3, 4 and 5 are graphs illustrating three examples of meter sensitivity distributions over the vertical center line in the image format.

FIG. 6 is a schmatic view of the optical system of another embodiment of a light metering device according to the present invention.

DETAILED DESCRIPTION OF THE PREFERRED EMBODIMENTS

FIG. 1 is a side sectional view of a single lens reflex camera, illustrating a light metering device of the invention adapted for TTL direct light metering. A position-changeable reflecting member 1 serves for light metering is located on the bottom of a mirror box. Light entering an objective lens 2 impinges upon a film plane 3, and an object image formed thereon is diffused, part of which is reflected by the member 1 to a condenser lens 4 followed by a photosensitive element 5. The photosensitive element 5 is made responsive to a portion of the area, for example, the central area 11 of the image format 3, and has a relatively small angle of coverage of the field. A finder mirror 6 is pivoted at a shaft 7.

What is especially important here is that the reflecting mirror 1 can be driven by a drive mechanism comprised of, for example, a small size motor 8 and a cam 9 mounted on the output shaft thereof as illustrated by an arrow at least when metering is being performed, while the speed of movement of the reflecting member 1 is changed. For example, the reflecting member 1 moves pivotally about a horizontal shaft 10 while changing its angular speed. If so, the image format 3 is scanned in a vertical direction at a changing rate with the result that the photosensitive element 5 receives the reflected light from the film plane 3 along a band 12. Since the intensity of light incident upon the photosensitive element 5 is constantly changing as the scanning proceeds, it follows that in order to derive a light value based on which the exposure determination is made, the electrical outputs of the photosensitive element 5 have to be integrated for a predetermined period by an integrator circuit. It is to be noted that the driving of the reflecting member 1 for light metering is not always necessary, and for this purpose the reflecting member 1 is arranged so that it is also possible to perform light metering with the reflecting member 1 allowed to stand still.

Therefore, when, for example, in the standstill mode of operation of the reflecting member for light metering, where the photosensitive element 5 reads the film plane 3 is limited to the central area of the film plane 3 indicated at 11 in FIG. 2 so that the device operates in a central spot metering mode. On the other hand, when the reflecting member 1 is turned about the horizontal shaft 10 during metering, the light distribution over the vertical band portion 12 in FIG. 2 is measured. In this case, the upper side of the band portion 12 is wider than the lower side thereof in proportion to the difference in distance between the reflecting member 1 and film plane 3. However, since the intensity of light incident upon the photosensitive element 5 is inversely proportional to the square of the distance so that it is weaker when the upper side is scanned, and stronger when the lower side is scanned, and since this has a larger effect than the difference in width of the band portion 12, as illustrated in FIG. 3, the weighting is progressively heavier when approaching the bottom side of the image format. In general, the lower portion of the image format corresponds to the upper portion of the actual scene where the sky, a lamp, or some other bright object often lies. Therefore, such metering will result in an under-exposure. To correct this one-sided heavy emphasis in the light meter sensitivity distribution, according to an embodiment of the present invention, use is made of a cam 9 to change the speed of the pivoting movement of the reflecting member 1. For example, the speed is faster than normal when the lower portion is scanned, slower when the central portion is scanned, and normal when the upper portion is scanned. Thus, the amount of light integrated, i, which represents the meter sensitivity is distributed as illustrated in FIG. 4 so that a central area priority photometry mode is established. That is, taking the amount of light radiating from the image on the film plane 3, and integrated over a time t, as represented by i(t) as the film plane 3 is scanned, and giving the weighting function by the reflecting member 1 as w(t), we have the light value in the form of an output of the integrator circuit in the next stage of the photosensitive element 5 expressed as:

$$I = \int w(t) i(t) dt$$

This weighting control function w(t) can be freely defined by the shape of the cam 9 so shaped as far as this embodiment is concerned. Accordingly, for example, a sensitivity distribution for average metering as illustrated in FIG. 5 can be selectively formed.

In FIG. 6 there is shown a second embodiment applied to a camera in which metering is performed with the relecting mirror 6 of the finder in the viewing position before an exposure is initiated. Since the finder mirror 6 has a central semi-transparent area, a light beam emerging from this area is reflected by a reflecting member 1' for light metering to the photosensitive element 5. This reflecting member 1' is made movable, for example, pivotally as indicated by arrow, during metering by a drive mechanism as in the first embodiment described in connection with FIG. 1. Its speed is made changeable to control the weighting of the light value.

Referring to FIG. 6, a major part of the light passing through the objective lens 1 is reflected upwards by the mirror 6 and then passes through a penta prism (not shown) and an eye-piece (not shown) to permit observation of an object image. The remaining portion of the light passes through the finder mirror 6 and reaches the reflecting member 1' for light metering. Pivoting movement of the reflecting member 1' about the horizontal axis results in the field of view being scanned vertically to obtain an equivalent band-like meter sensitivity distribution to that of FIG. 2. If the reflecting member 1' is, however, moved at a constant speed, a strength distribution similar to that of FIG. 3 will result. Therefore, in order to allow for a proper distribution to be formed, the speed of movement is changed during metering. Here, because a light metering ununiformity is produced due to the vignetting of the pupil based on the difference between the position of the exit pupil as seen from the film plane 3 and the position of the reflecting mirror 1' for light metering, the determination of w(t) has to be made so as to compensate for this. It is noted that, to make an exposure, the reflecting member 1' must be retracted from the illustrated position. Provision is, of course, made for moving the reflecting member 1' either with the finder mirror 6 or independently of the latter.

The foregoing embodiments have been described in connection with the scanning of the image format and the selective control of the weighting as carried out by moving the reflecting member 1, 1' for light metering. However in actual practice, because all that is required for scanning is to change the relative position of the reflecting member 1, 1' and photosensitive element 5 to each other, an equivalent result can be also effected by moving the photosensitive element 5 while simultaneously maintaining the reflecting member 1, 1' stationary. The mechanism for driving the reflecting member 1, 1' or the photosensitive element 5 may take other forms than the above-mentioned small size electric motor 8. For example, a spring motor or magnet may be used. Also the path of movement may, in addition to the pivoting movement, be linear, swinging or of other suitable types. Further the weighting means, besides the cam 9, may use customary mechanical means such as a crank may be adopted. Without resorting to mechanical means, this can also be achieved by electrical means. That is, the output from the photosensitive element 5 is later processed in a time sequential manner, and the pulsed outputs after having been multiplied by respective coefficients in the function w(t) are then integrated to produce a desired weighting. Further modification can be made such that almost the entire area of the image format is measured by using two combinations of the reflecting member. This is accomplished by having one drive mechanism and weighting means operating so that one of the combinations serves to scan horizontally, and the other to scan vertically. At the same time, the diffusing light is directed from one of the reflecting members to the other and further therefrom to the photosensitive elements. This results in light metering over a cross-like patch in the image format with the weighting in each of the horizontal and vertical bands.

As described above, the light metering-with-selective control of a weighting device for a camera according to the present invention is advantageous in that only one photosensitive element suffices, that without having particularly to increase the number of light metering optical systems, at least spot and average metering modes can be chosen, and that a desired sensitivity distribution can be obtained.

What is claimed is:

1. A camera with a light metering device, comprising:
   lens means for forming an object image on a film surface of the camera;
   light measuring means for measuring the light passing through said lens;
   light conducting means for directing a portion of the diffusedly reflected light from the film surface to said light metering means, said light conducting means being arranged to be movable between a first position where the diffusedly reflected light from the portion of the film surface farthest from said light measuring means is directed to said light measuring means and a second position where the diffusedly reflected light from the portion of the film surface nearest to said light measuring means is directed to the said light means; and
   driving means for moving said light conducting means between the first and second positions fastest as said light conducting means nears the second position.

2. A device according to claim 1, wherein said driving means moves said light conducting means slowest when said light conducting means moves past a middle position between the first and second positions.

3. A device according to claim 2, wherein said driving means adjusts the speed of movement of said light conducting means near the first position to a value between the values of the speed of movement of the light conducting means near the middle and second positions respectively.

4. A device according to claim 3, wherein said driving means includes an electric motor and a cam operatively connected to said motor.

5. A device according to claim 4, wherein said light conducting means includes a reflection member for reflecting light from the film surface.

* * * * *